United States Patent
Tsai et al.

(10) Patent No.: US 10,131,225 B2
(45) Date of Patent: Nov. 20, 2018

(54) COMBINATION KEY AND GEAR SELECTION KNOB

(71) Applicant: Toyota Motor Sales, U.S.A., Inc., Torrance, CA (US)

(72) Inventors: David Tsai, Irvine, CA (US); Steve Basra, Frisco, TX (US); John McLaughlin, Huntington Beach, CA (US); Shady Shahid, Piedmont, CA (US); Greg McNamara, San Francisco, CA (US); Per Selvaag, Berkeley, CA (US)

(73) Assignee: Toyota Motor Sales, U.S.A., Inc., Torrance, CA (US)

( * ) Notice: Subject to any disclaimer, the term of this patent is extended or adjusted under 35 U.S.C. 154(b) by 61 days.

(21) Appl. No.: 15/272,714

(22) Filed: Sep. 22, 2016

(65) Prior Publication Data

US 2018/0079302 A1    Mar. 22, 2018

(51) Int. Cl.

| G06F 7/00 | (2006.01) |
|---|---|
| G05B 19/00 | (2006.01) |
| G05B 23/00 | (2006.01) |
| G08B 29/00 | (2006.01) |
| G08C 19/00 | (2006.01) |
| G05B 23/02 | (2006.01) |
| G08B 5/00 | (2006.01) |
| G05B 19/02 | (2006.01) |
| E05B 65/00 | (2006.01) |
| E05B 49/00 | (2006.01) |

(Continued)

(52) U.S. Cl.
CPC ............. B60K 26/02 (2013.01); B60R 25/24 (2013.01); F16H 59/0217 (2013.01); F16H 59/08 (2013.01); F16H 63/42 (2013.01); F16H 2059/026 (2013.01); F16H 2059/081 (2013.01); F16H 2063/423 (2013.01)

(58) Field of Classification Search
None
See application file for complete search history.

(56) References Cited

U.S. PATENT DOCUMENTS

| 4,395,780 A * | 7/1983 | Gohm .................. H04N 7/22 348/E7.071 |
|---|---|---|
| 5,595,064 A * | 1/1997 | Ikeda ................ B60H 1/00392 180/65.1 |

(Continued)

Primary Examiner — Steven Lim
Assistant Examiner — Muhammad Adnan
(74) Attorney, Agent, or Firm — Christopher G. Darrow; Darrow Mustafa PC (57) ABSTRACT

A system for ignition control and gear selection of a vehicle is described herein. The system comprises a removable device, a docking portion of the vehicle, and a control module of the vehicle. The removable device comprises identification circuitry; and a body housing the identification circuitry. The docking portion of the vehicle is configured to receive the removable device. The control module of the vehicle is configured to identify the removable device prior to ignition of the vehicle, the removable device identified based, at least in part, on the identification circuitry; cause ignition of the vehicle in response to detecting a first interaction with the removable device; and cause the vehicle to change from a first gear to a second gear in response to detecting a second interaction with the removable device.

20 Claims, 7 Drawing Sheets

(51) Int. Cl.
*F16H 59/08* (2006.01)
*B60K 26/02* (2006.01)
*F16H 59/02* (2006.01)
*F16H 63/42* (2006.01)
*B60R 25/24* (2013.01)

(56) References Cited

U.S. PATENT DOCUMENTS

| | | | | |
|---|---|---|---|---|
| 6,259,168 | B1* | 7/2001 | Okada | B60R 25/04 |
| | | | | 123/198 DB |
| 6,400,254 | B2* | 6/2002 | Yamamoto | B60R 25/02142 |
| | | | | 307/10.3 |
| 6,930,594 | B1* | 8/2005 | Wang | B60Q 1/1476 |
| | | | | 200/43.17 |
| 7,227,447 | B2* | 6/2007 | Ohtaki | B60R 25/04 |
| | | | | 307/10.2 |
| 8,264,338 | B2 | 9/2012 | Leon | |
| 8,548,645 | B2* | 10/2013 | Long | B60R 25/045 |
| | | | | 307/10.1 |
| 8,581,718 | B2 | 11/2013 | Muller et al. | |
| 2003/0016136 | A1* | 1/2003 | Harvey | H01H 9/167 |
| | | | | 340/686.1 |
| 2005/0107673 | A1* | 5/2005 | Ball | A61B 5/411 |
| | | | | 600/301 |
| 2006/0107782 | A1* | 5/2006 | Perry | B60R 25/06 |
| | | | | 74/523 |
| 2009/0146798 | A1* | 6/2009 | Gencyuz | F16H 59/02 |
| | | | | 340/456 |
| 2009/0151412 | A1* | 6/2009 | Chung | B60R 25/066 |
| | | | | 70/247 |
| 2009/0195375 | A1* | 8/2009 | Berg | F16H 63/42 |
| | | | | 340/456 |
| 2011/0025488 | A1* | 2/2011 | Leon | B60K 37/06 |
| | | | | 340/456 |
| 2013/0261845 | A1* | 10/2013 | Ho | G06F 17/00 |
| | | | | 701/2 |
| 2015/0171659 | A1* | 6/2015 | Lee | H02J 7/025 |
| | | | | 320/108 |
| 2015/0251534 | A1* | 9/2015 | Kim | B60K 20/08 |
| | | | | 180/333 |
| 2016/0073253 | A1* | 3/2016 | Grodin | H04W 48/04 |
| | | | | 455/418 |
| 2016/0146335 | A1* | 5/2016 | McGuire | F16H 59/105 |
| | | | | 701/51 |
| 2017/0057505 | A1* | 3/2017 | Woodley | B60W 10/06 |
| 2017/0328465 | A1* | 11/2017 | McGuire | F16H 61/662 |

* cited by examiner

COMBINATION KEY AND GEAR SELECTION KNOB

TECHNICAL FIELD

The subject matter described herein relates in general to vehicle control devices and, more particularly, to a combination key and gear selection knob.

BACKGROUND

Vehicles typically have a key or perhaps a fob used for ignition of the vehicle. The key or fob is a device intended to only allow the possessor of the key or fob to be able to start a vehicle. Vehicles are designed to operate in several gears. For example, drive, reverse, neutral, and park. Once a vehicle has been started, there is typically a lever or control mechanism for shifting gears. The gear shifting mechanism is separate from the ignition mechanism in vehicles. A driver must start the vehicle in one location and then reposition their hand to another location to place the car in gear.

SUMMARY

In an embodiment herein, a removable device for ignition control and gear selection of a vehicle is described. The removable device comprises identification circuitry configured to identify the removable device to the vehicle prior to ignition of the vehicle. The removable device also comprises a body housing the identification circuitry, the body configured to interact with the vehicle in a first interaction to cause ignition of the vehicle; and interact with the vehicle in a second interaction to cause the vehicle to change from a first gear to a second gear.

In another embodiment herein, a system for ignition control and gear selection of a vehicle is described. The system comprises a removable device, a docking portion of the vehicle, and a control module of the vehicle. The removable device comprises identification circuitry; and a body housing the identification circuitry. The docking portion of the vehicle is configured to receive the removable device. The control module of the vehicle is configured to identify the removable device prior to ignition of the vehicle, the removable device identified based, at least in part, on the identification circuitry; cause ignition of the vehicle in response to detecting a first interaction with the removable device; and cause the vehicle to change from a first gear to a second gear in response to detecting a second interaction with the removable device.

In another embodiment herein, a method for ignition control and gear selection of a vehicle is described. The method comprises docking a removable device at a docking portion of the vehicle; identifying the removable device prior to ignition of the vehicle; causing ignition of the vehicle in response to detecting a first interaction with the removable device; and causing the vehicle to change from a first gear to a second gear in response to detecting a second interaction with the removable device.

DETAILED DESCRIPTION

Described herein is a device that acts as a key for ignition and a gear shifter of a vehicle. The device may be referred to herein as a pebble. A driver may enter the vehicle and place the pebble in an area designated for docking the pebble, e.g., a console or steering column. The user may then depress the pebble or tap the pebble or perform some other action to indicate ignition is desired. After ignition, the pebble may be rotated to select a desired gear for the vehicle, e.g., drive, reverse, etc. When the user decides to turn off the vehicle, the pebble may be rotated to select park, and then the user may depress the pebble or tap the pebble or perform some other action to indicate that turn off of the engine is desired.

In an embodiment, the vehicle may have one or more transceiver devices in proximity of the area designated for docking of the pebble. The pebble may have identification circuitry for identifying the pebble to a control module of the vehicle. The identification circuitry may be passive or active. Passive identification circuitry may not require a power source, and active identification circuitry may require a power source to transmit an identification signal. The transceiver devices of the vehicle and the identification circuitry of the pebble may be configured to communicate wirelessly or in a wired fashion via electrical contacts. When the pebble is interacted with to cause ignition, a signal may be transmitted from the control module of the vehicle to the pebble or from the pebble to the control module. As part of the ignition process, the pebble may transmit an identifier to the control module. If the pebble has a known identifier, the control module may cause ignition of the vehicle. In an embodiment, the identification process between the control module and the pebble may occur as soon as the pebble is placed in the area designated for docking of the pebble. In another embodiment, the identification process between the control module and the pebble may occur as soon as the pebble is within a certain proximity of the vehicle.

In an embodiment, a vehicle associated with the pebble may be configured to communicate with the pebble when the pebble is not in proximity of the vehicle. The vehicle may transmit information about the vehicle to the pebble. For example, a status of the vehicle may be transmitted to the pebble. In an embodiment, if the vehicle is damaged while parked, the vehicle may send a notification to the pebble. The vehicle is burglarized while parked, the vehicle may send a notification to the pebble. The vehicle may transmit its location to the pebble if a user cannot locate the vehicle. The vehicle may transmit other information to the pebble based upon requirements of the user and/or the manufacturer of the pebble and/or vehicle.

Figures 1A, 1B:
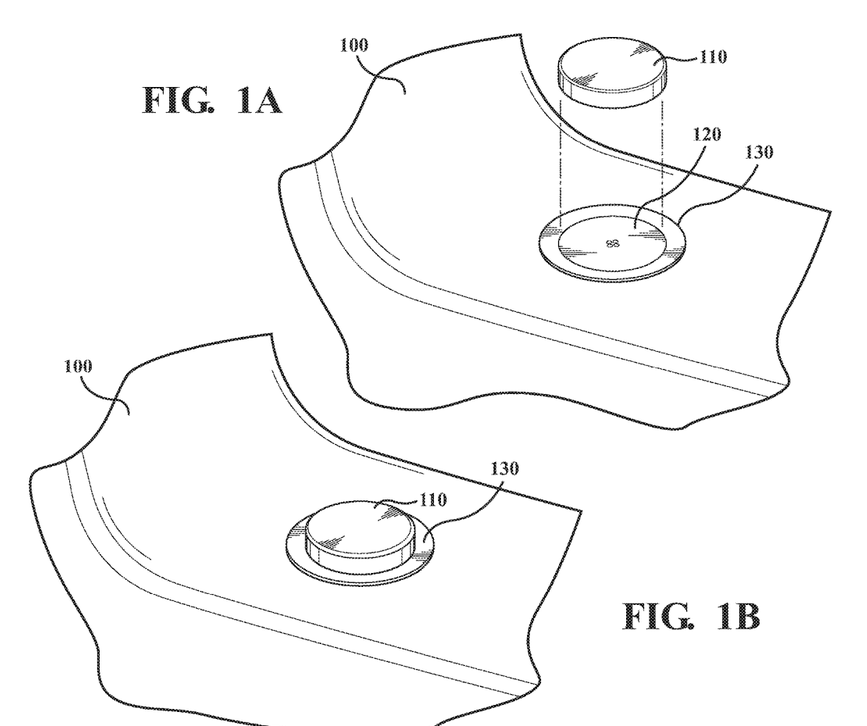
FIG. 1A is a diagram of a first view of an embodiment of a system for combined ignition and gear selection.
FIG. 1B is a diagram of a second view of an embodiment of the system for combined ignition and gear selection.

FIG. 1A is a diagram of a first view of an embodiment of a system for combined ignition and gear selection 100. Pebble 110 may be configured to act as a key for ignition of the engine. Pebble 110 may further be configured to act as a gear shifter. Pebble 110 may be cylindrical or spherical in shape. In other embodiments, pebble 110 may be any shape or size based upon manufacturing requirements or desires of a user or both. Area 120 may be a portion of a console designated for docking of the pebble 110. Area 120 may flush with the surrounding portion of the console. Area 120 may display an indicator indicating where to place pebble 110 or may have some other markings indicating where to place pebble 110. Sleeve 130 may be flush with the surrounding portion of the console and may surround area 120. Sleeve 130 may be of a diameter slightly larger than pebble 110 such that pebble 110 may seat within sleeve 130.

FIG. 1B is a diagram of a second view of an embodiment of the system for combined ignition and gear selection 100. Area 120 may contain a magnetic device or some other mechanism for docking pebble 110 to area 120. In this view, a user may have docked pebble 110 on area 120. Pebble 110 may be held in place over area 120 for use as an ignition key and gear shifter.

Figure 1C:
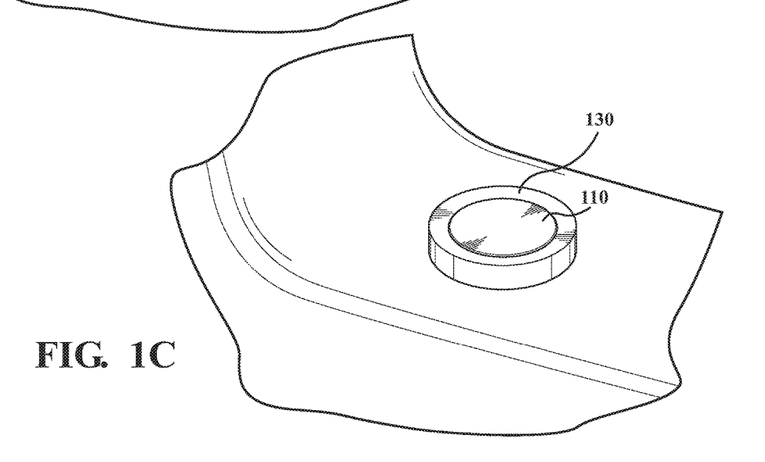
FIG. 1C is a diagram of a third view of an embodiment of the system for combined ignition and gear selection.

FIG. 1C is a diagram of a third view of an embodiment of the system for combined ignition and gear selection 100. In this view, sleeve 130 may extend upward from the console to surround pebble 110. Sleeve 130 may prevent pebble 110 from sliding off area 120. Sleeve 130 may be rotatable for selecting a gear for the vehicle. In other embodiments, pebble 110 may be rotatable for selecting a gear for the vehicle.

Figures 2A, 2B, 2C:
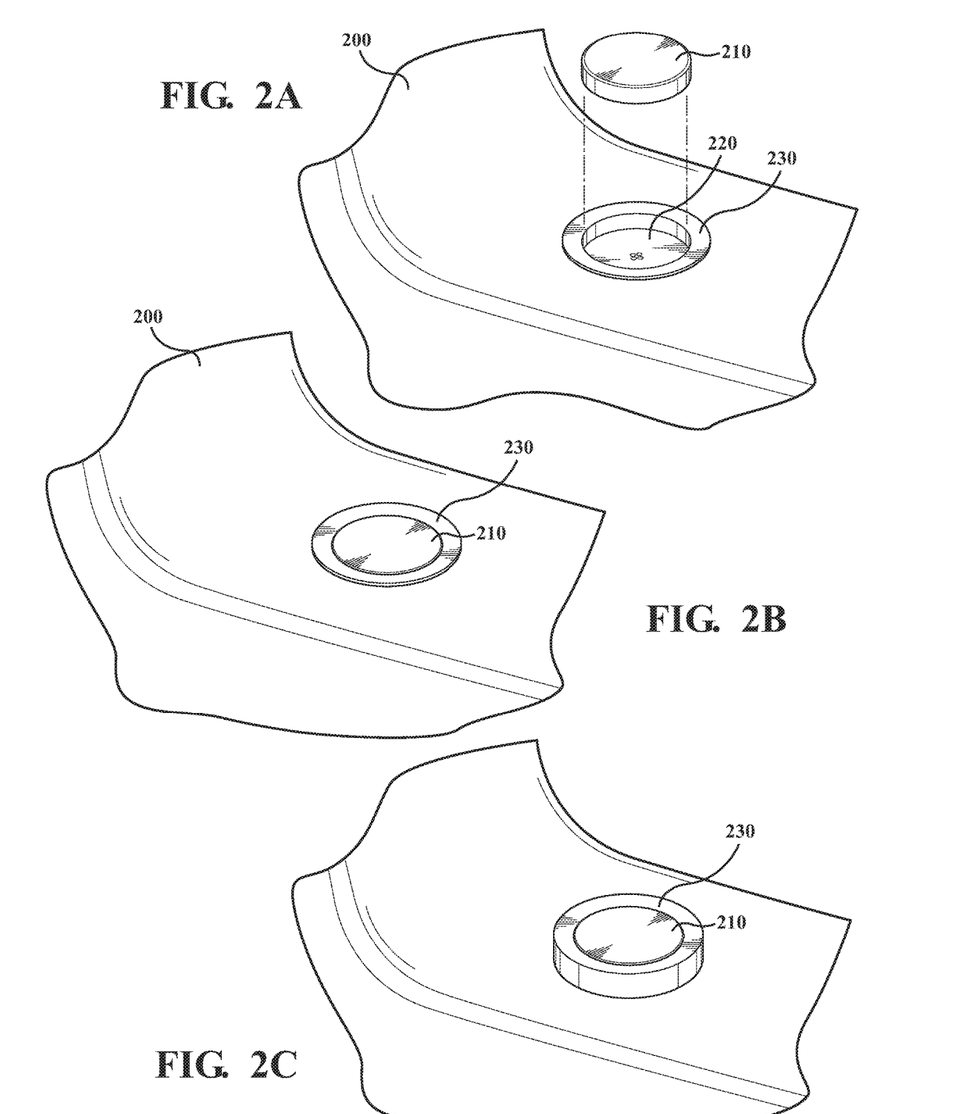
FIG. 2A is a diagram of a first view of another embodiment of a system for combined ignition and gear selection.
FIG. 2B is a diagram of a second view of an embodiment of the system for combined ignition and gear selection.
FIG. 2C is a diagram of a third view of an embodiment of the system for combined ignition and gear selection.

FIG. 2A is a diagram of a first view of another embodiment of a system for combined ignition and gear selection 200. Pebble 210 may be configured to act as a key for ignition of the engine. Pebble 210 may further be configured to act as a gear shifter. Pebble 210 may be cylindrical or spherical in shape. In other embodiments, pebble 210 may be any shape or size based upon manufacturing requirements or desires of a user or both. Area 220 may be a portion of a console designated for docking of the pebble 210. Area 220 may be a cylindrical opening in the surrounding portion of the console. Area 220 may display an indicator indicating where to dock pebble 210 or may have some other markings indicating where to place pebble 210. Sleeve 230 may be flush with the surrounding portion of the console and may surround area 220. Sleeve 230 may be of a diameter slightly larger than pebble 210 such that pebble 210 may seat within sleeve 230.

FIG. 2B is a diagram of a second view of an embodiment of the system for combined ignition and gear selection 200. Area 220 may contain a magnetic device or some other mechanism for securing pebble 210 within area 220. In this view, a user may have docked pebble 210 in area 220. Pebble 210 may be held in place within area 220 for use as an ignition key and gear shifter.

FIG. 2C is a diagram of a third view of an embodiment of the system for combined ignition and gear selection 200. In this view, sleeve 230 may extend upward from the console to surround pebble 210. Sleeve 230 may prevent pebble 210 from sliding out of area 220. Sleeve 230 may be rotatable for selecting a gear for the vehicle. In other embodiments, pebble 210 may be rotatable for selecting a gear for the vehicle.

Figure 3A:
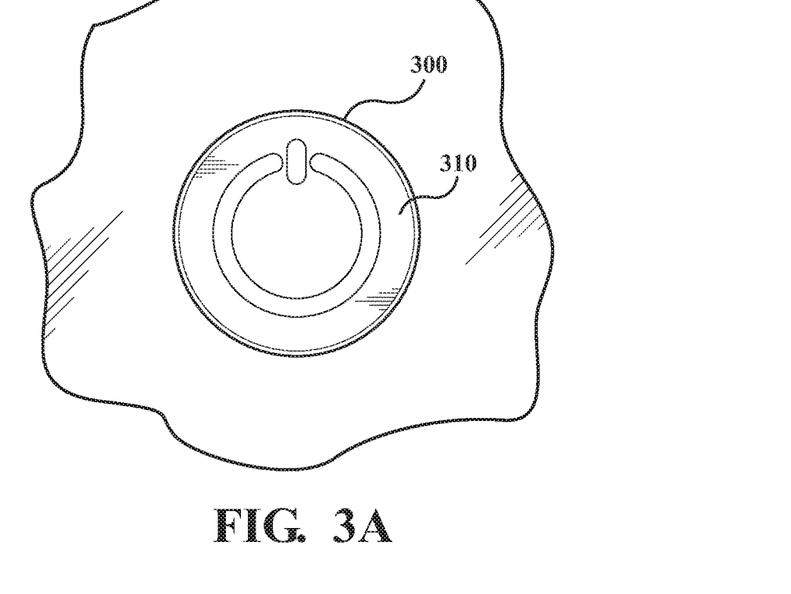
FIG. 3A is a diagram of a first view of an embodiment of an integrated display of a pebble controlling ignition.

FIG. 3A is a diagram of a first view of an embodiment of an integrated display 310 of a pebble 300 controlling ignition. The integrated display 310 may be an LCD, OLED, or some other type of display. Integrated display 310 may be a touch screen. In the first view, the integrated display 310 may depict a power on indicator. The power on indicator may be displayed after pebble 300 is docked on a console or steering column or other designated area prior to ignition of the vehicle.

Figure 3B:
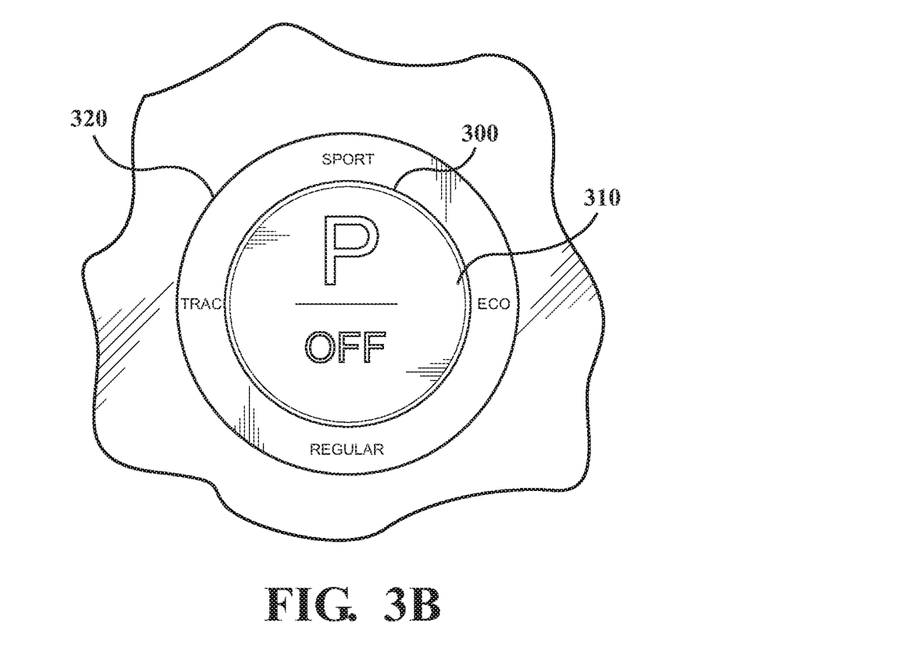
FIG. 3B is a diagram of a second view of an embodiment of an integrated display of a pebble controlling ignition.

FIG. 3B is a diagram of a second view of an embodiment of an integrated display 310 of a pebble 300 controlling ignition. In the second view, the integrated display 310 may display a park indicator, indicating that the vehicle is currently in park. The integrated display 310 may display an off indication, indicating that the vehicle may be turned off from this gear. Display 320 may be part of a sleeve (e.g. sleeve 130, 230). Display 320 may be part of the console surrounding an area designated for the pebble 300. Display 320 may be touch sensitive. Display 320 may display various driving options that user may select. For example, display 320 may display a sport mode, eco mode, traction mode, and regular mode. Other modes may be displayed on display 320 based on the features of the vehicle.

Figure 4A:
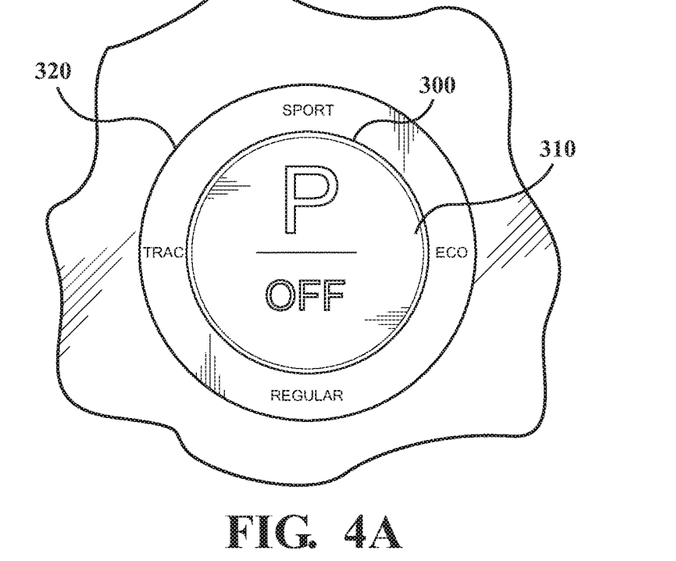
FIG. 4A is a diagram of a first view of an embodiment of an integrated display of a pebble controlling gear shifting.

FIG. 4A is a diagram of a first view of an embodiment of an integrated display 310 of a pebble 300 controlling gear shifting. In the first view, the integrated display 310 may display a park indicator, indicating that the vehicle is currently in park. The integrated display 310 may display an off indication, indicating that the vehicle may be turned off from this gear. Display 320 may be part of a sleeve (e.g. sleeve 130, 230). Display 320 may be part of the console surrounding an area designated for the pebble 300. Display 320 may be touch sensitive. Display 320 may display various driving options that user may select. For example, display 320 may display a sport mode, eco mode, traction mode, and regular mode. Other modes may be displayed on display 320 based on the features of the vehicle.

Figure 4B:
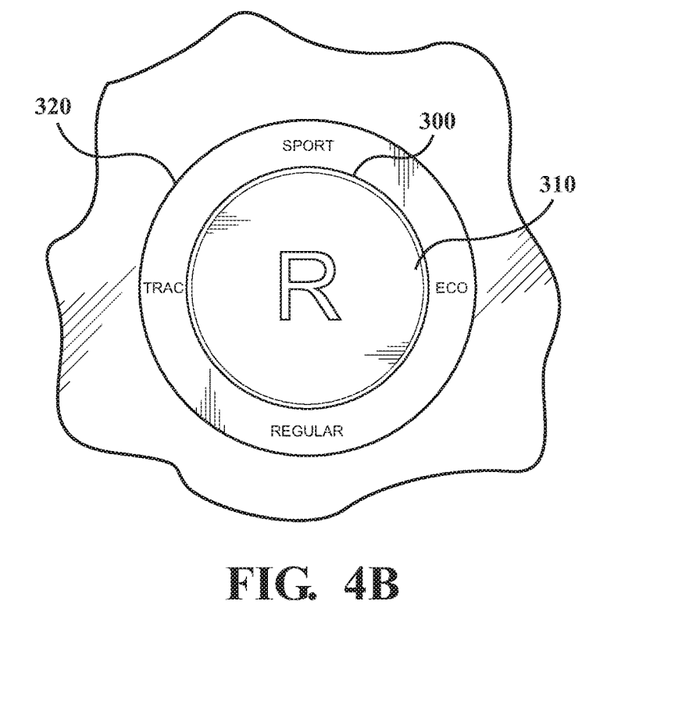
FIG. 4B is a diagram of a second view of an embodiment of an integrated display of a pebble controlling gear shifting.

FIG. 4B is a diagram of a second view of an embodiment of an integrated display 310 of a pebble 300 controlling gear shifting. In the second view, the integrated display 310 may display a reverse indicator, indicating that the vehicle is currently in reverse. Display 310 may be updated based on an input received at the pebble 300. In an embodiment, the pebble 300 may be rotated to change gears. In some embodiments, pebble 300 may be tapped, spoken to, or some other method of input to the pebble 300, to cause the vehicle to shift into reverse.

Figure 4C:
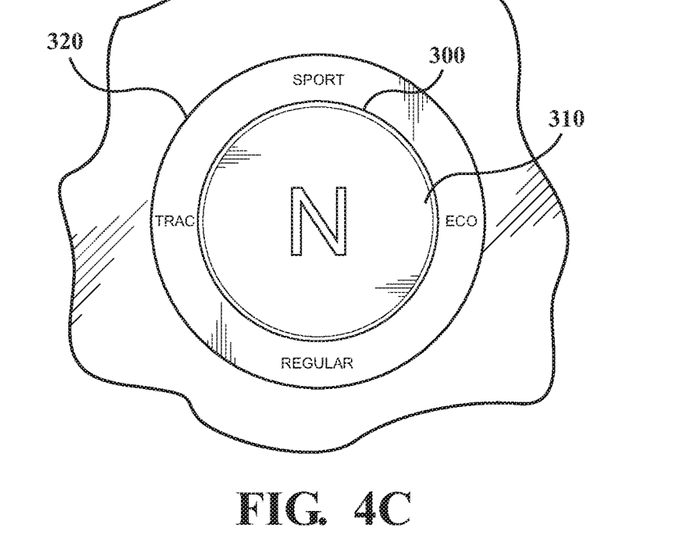
FIG. 4C is a diagram of a third view of an embodiment of an integrated display of a pebble controlling gear shifting.

FIG. 4C is a diagram of a third view of an embodiment of an integrated display 310 of a pebble 300 controlling gear shifting. In the third view, the integrated display 310 may display a neutral indicator, indicating that the vehicle is currently in neutral. Display 310 may be updated based on an input received at the pebble 300. In an embodiment, the pebble 300 may be rotated to change gears. In some embodiments, pebble 300 may be tapped, spoken to, or some other method of input to the pebble 300, to cause the vehicle to shift into neutral.

Figure 4D:
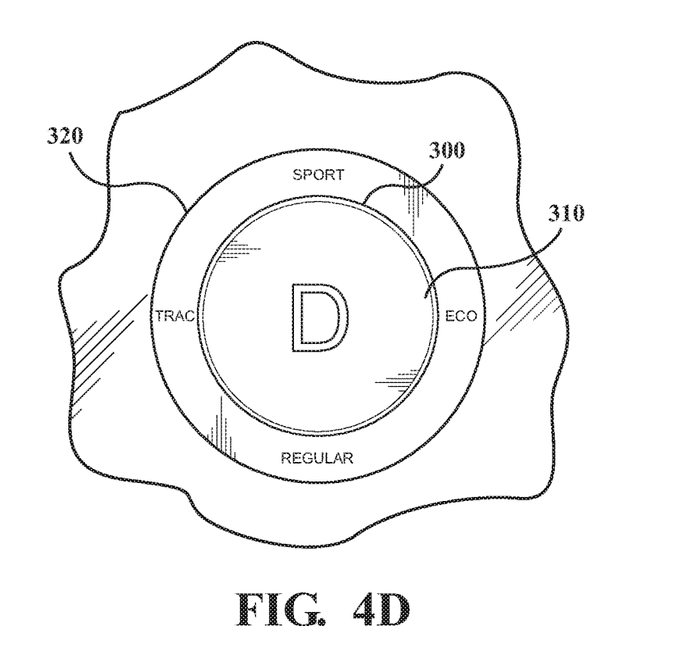
FIG. 4D is a diagram of a fourth view of an embodiment of an integrated display of a pebble controlling gear shifting.

FIG. 4D is a diagram of a fourth view of an embodiment of an integrated display 310 of a pebble 300 controlling gear shifting. In the fourth view, the integrated display 310 may display a drive indicator, indicating that the vehicle is currently in drive. Display 310 may be updated based on an input received at the pebble 300. In an embodiment, the pebble 300 may be rotated to change gears. In some embodiments, pebble 300 may be tapped, spoken to, or some other method of input to the pebble 300, to cause the vehicle to shift into drive.

Figure 5:
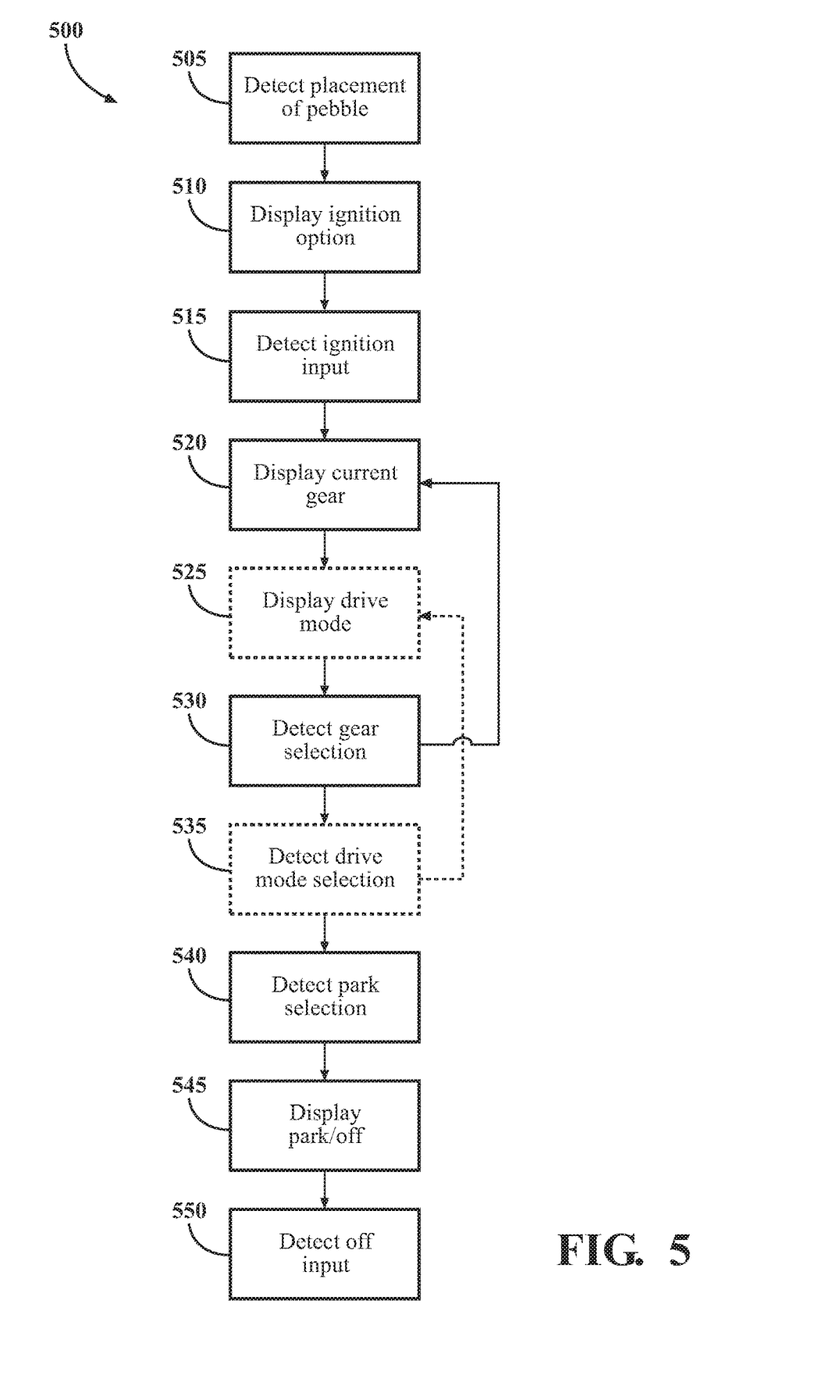
FIG. 5 is a flow diagram of an embodiment of a method for combined vehicle ignition and gear control.

FIG. 5 is a flow diagram of an embodiment of a method 500 for combined vehicle ignition and gear control. The method 500 begins at block 505 when docking of a pebble (e.g., pebble 110, 210, 300) in a designated area is detected by a control module. The pebble may be detected by an active form of detection, e.g., transmitting and/or receiving a signal either wirelessly or via electrical contacts on the pebble. In another embodiment, the pebble may be detected by a passive form of detection, e.g., magnetic field from pebble detected by control module. The control module may be one or more systems configured to interact with the pebble and other systems of the vehicle. The control module may be any combination of hardware and/or software.

At block 510, an ignition option is displayed. The ignition option may be displayed on the pebble, on an instrument cluster, a heads up display, or some other display are viewable by a user. The ignition option may be an image of a power button, a message, e.g., push to start, or some other indicator to prompt a user as to how to start the vehicle. At block 515, the control module may detect the ignition input. The ignition input may be any type of input received from a user indicating that ignition should be accomplished. The ignition input may correspond to the ignition option displayed in block 510. For example, a user may press the pebble or some other button to cause the vehicle to start. The control module may interact with the pebble to authenticate the pebble before starting the vehicle.

At block 520, following ignition of the vehicle, the current gear of the vehicle may be displayed. For example, park may be displayed. The current gear may be displayed on the pebble, in an instrument cluster, on a heads-up-display, or other locations. Optionally, at block 525, a drive mode may be displayed. For example, drive mode may include, regular, economy, traction control, four wheel, etc. The drive mode may be displayed on the pebble, in an instrument cluster, on a heads-up-display, or other locations.

At block 530 the control module may detect a gear selection. Gears may be selected by rotating the pebble, or other some other type of interaction with the pebble. When a gear shift occurs, the method may return to block 520 to display the newly selected gear. Optionally, at block 535, the control module may detect a drive mode selection. Drive mode may be selected by interacting with the pebble, the area-surrounding the pebble, or some other area for selecting a drive mode. When a new drive mode is selected, the method may return to block 525 to display the newly selected drive mode.

At block 540 the control module may detect a selection of park. A user may interact with the pebble to place the vehicle in park. For example, the user may rotate the pebble to a position indicated as park. A step 545, "park" and/or "off" may be displayed on the pebble, in an instrument cluster, on a heads-up-display, or other locations. The "off" display may indicate an option to turn the vehicle off when the vehicle is placed in park.

At block 550, an off input may be detected. A user may interact with the pebble to turn off the vehicle. For example, the user may tap the pebble, press the pebble or perform some other action to indicate that the vehicle should be turned off. The control module may then cause the vehicle to turn off in response to detecting the off input.

Figure 6:
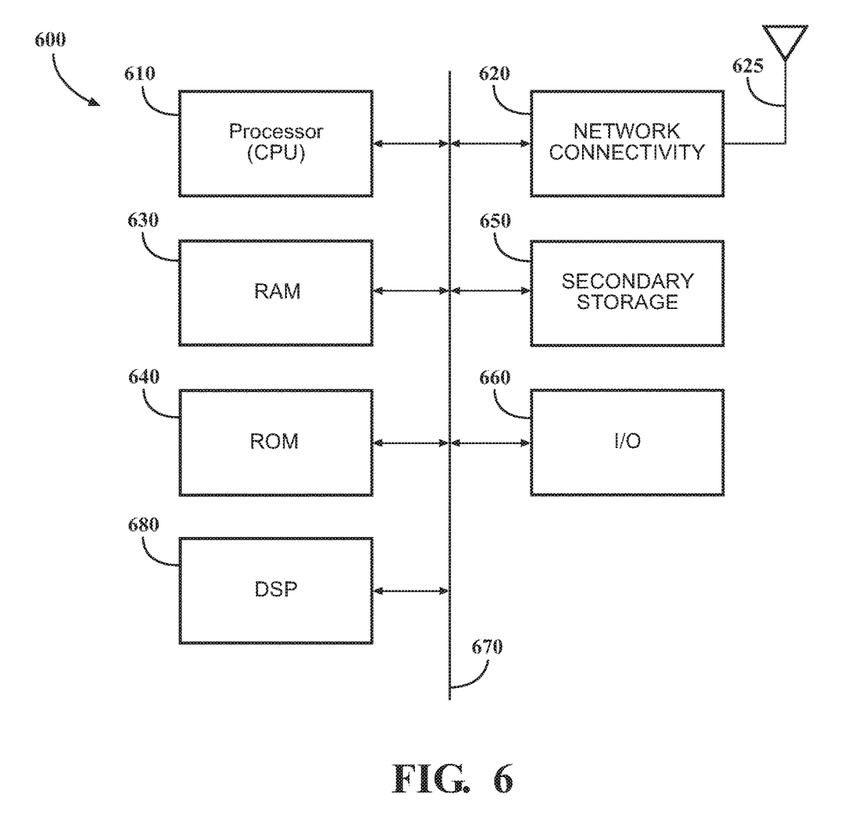
FIG. 6 is a diagram of an embodiment of a system for combined ignition and gear selection.

FIG. 6 illustrates an example of a system 600 that includes a processor 610 suitable for implementing one or more embodiments disclosed herein. The processor 610 may control the overall operation of the control module.

In addition to the processor 610 (which may be referred to as a central processor unit or CPU), the system 600 might include network connectivity devices 620, random access memory (RAM) 630, read only memory (ROM) 640, secondary storage 650, and input/output (I/O) devices 660. These components might communicate with one another via a bus 670. In some cases, some of these components may not be present or may be combined in various combinations with one another or with other components not shown. These components might be located in a single physical entity or in more than one physical entity. Any actions described herein as being taken by the processor 610 might be taken by the processor 610 alone or by the processor 610 in conjunction with one or more components shown or not shown in the drawing, such as a digital signal processor (DSP) 680. Although the DSP 680 is shown as a separate component, the DSP 680 might be incorporated into the processor 610.

The processor 610 executes instructions, codes, computer programs, or scripts that it might access from the network connectivity devices 620, RAM 630, ROM 640, or secondary storage 650 (which might include various disk-based systems such as hard disk, floppy disk, or optical disk). While only one CPU 610 is shown, multiple processors may be present. Thus, while instructions may be discussed as being executed by a processor, the instructions may be executed simultaneously, serially, or otherwise by one or multiple processors. The processor 610 may be implemented as one or more CPU chips and may be a hardware device capable of executing computer instructions. The processor 610 may execute instructions that cause the system 600 to perform the method described in FIG. 5.

The network connectivity devices 620 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, universal mobile telecommunications system (UMTS) radio transceiver devices, long term evolution (LTE) radio transceiver devices, worldwide interoperability for microwave access (WiMAX) devices, and/or other well-known devices for connecting to networks. These network connectivity devices 620 may enable the processor 610 to communicate with the Internet or one or more telecommunications networks or other networks from which the processor 610 might receive information or to which the processor 610 might output information. The network connectivity devices 620 might also include one or more transceiver components 625 capable of transmitting and/or receiving data wirelessly.

The RAM 630 might be used to store volatile data and perhaps to store instructions that are executed by the processor 610. The ROM 640 is a non-volatile memory device that typically has a smaller memory capacity than the memory capacity of the secondary storage 650. ROM 640 might be used to store instructions and perhaps data that are read during execution of the instructions. Access to both RAM 630 and ROM 640 is typically faster than to secondary storage 650. The secondary storage 650 is typically comprised of one or more disk drives or tape drives and might be used for non-volatile storage of data or as an over-flow data storage device if RAM 630 is not large enough to hold all working data. Secondary storage 650 may be used to store programs that are loaded into RAM 630 when such programs are selected for execution.

The I/O devices 660 may include liquid crystal displays (LCDs), organic light-emitting diode (OLED) displays, flexible displays, circular displays, e-ink displays, touch screen displays, keyboards, keypads, switches, dials, mice, track balls, voice recognizers, card readers, paper tape readers, printers, video monitors, or other well-known input/output devices. Also, the transceiver 625 might be considered to be a component of the I/O devices 660 instead of or in addition to being a component of the network connectivity devices 620.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium.

What is claimed is:

1. A removable device for ignition control and gear selection of a vehicle, the removable device comprising:
    identification circuitry configured to identify the removable device to the vehicle prior to ignition of the vehicle; and a body housing the identification circuitry, the removable device being configured to:
    interact with the vehicle in a first interaction to cause ignition of the vehicle; and
    interact with the vehicle in a second interaction to cause the vehicle to change from a first gear to a second gear, the second interaction including rotating the body.

2. The removable device of claim 1, further comprising an integrated display
    configured to display at least one member selected from the group consisting of: a current gear, an ignition option, and a power off option.

3. The removable device of claim 2, wherein the integrated display comprises a touch interface, the touch interface configured to control one or more systems of the vehicle.

4. The removable device of claim 1, wherein the first interaction comprises depressing the body.

5. A system for ignition control and gear selection of a vehicle, the system comprising:
    a removable device comprising:
        identification circuitry; and
        a body housing the identification circuitry;
    a docking portion of the vehicle, the docking portion configured to receive the removable device; and
    a control module of the vehicle, the control module configured to:
        identify the removable device prior to ignition of the vehicle, the removable device identified based, at least in part, on the identification circuitry;
        cause ignition of the vehicle in response to detecting a first interaction with the removable device; and
        cause the vehicle to change from a first gear to a second gear in response to detecting a second interaction with the removable device, the second interaction including a rotation of the body or an audible interaction with the removable device.

6. The system of claim 5, wherein the removable device further comprises an integrated display configured to display at least one member selected from the group consisting of: a current gear, an ignition option, and a power off option.

7. The system of claim 6, wherein the integrated display comprises a touch interface, the touch interface configured to control one or more systems of the vehicle.

8. The system of claim 5, wherein the first interaction comprises depressing the body.

9. A system for ignition control and gear selection of a vehicle, the system comprising: a removable device comprising:
    identification circuitry; and a body housing the identification circuitry;
a docking portion of the vehicle, the docking portion configured to receive the removable device;
a control module of the vehicle, the control module configured to:
identify the removable device prior to ignition of the vehicle, the removable device identified based, at least in part, on the identification circuitry;
cause ignition of the vehicle in response to detecting a first interaction with the removable device; and
cause the vehicle to change from a first gear to a second gear in response to detecting a second interaction with the removable device; and
an extendable sleeve, the extendable sleeve configured to extend around the removable device in response to docking of the removable device at the docking portion.

10. The system of claim 9, wherein the second interaction comprises rotating the extendable sleeve.

11. The system of claim 9, further comprising a display configured to display driving modes of the vehicle.

12. The system of claim 11, wherein the control module is further configured to detect a third interaction with the display and cause the vehicle to change from a first driving mode to a second driving mode in response to detecting the third interaction.

13. The system of claim 12, wherein the display comprises a touch screen, and wherein the third interaction comprises touching the touch screen.

14. A method for ignition control and gear selection of a vehicle, the method comprising:
identifying a removable device prior to ignition of the vehicle;
causing ignition of the vehicle in response to detecting a first interaction with the removable device; and
causing the vehicle to change from a first gear to a second gear in response to detecting a second interaction with the removable device,
the second interaction including a rotation of the removable device or an audible interaction with the removable device.

15. The method of claim 14, further comprising: displaying, on an integrated display of the removable device, at least one member selected from the group consisting of: a current gear, an ignition option, and a power off option.

16. The method of claim 14, wherein the first interaction comprises depressing the removeable device.

17. A method for ignition control and gear selection of a vehicle, the method comprising:
causing an extendable sleeve to extend around a removable device in response to docking of the removable device at a docking portion of the vehicle;
identifying the removable device prior to ignition of the vehicle;
causing ignition of the vehicle in response to detecting a first interaction with the removable device; and
causing the vehicle to change from a first gear to a second gear in response to detecting a second interaction with the removable device.

18. A removable device for ignition control and gear selection of a vehicle, the removable device comprising:
identification circuitry configured to identify the removable device to the vehicle prior to ignition of the vehicle; and
a body housing the identification circuitry, the removable device being configured to:
responsive to detecting a first user interaction with the removable device, interact with the vehicle to cause ignition of the vehicle; and
responsive to detecting a second user interaction with the removable device, interact with the vehicle to cause the vehicle to change from a first gear to a second gear, the second user interaction including a rotation of the removable device or an audible interaction with the removable device.

19. A method for ignition control and gear selection of a vehicle, the method comprising:
responsive to detecting a first user interaction with a removable device, causing ignition of the vehicle; and
responsive to detecting a second user interaction with the removable device, causing the
vehicle to change from a first gear to a second gear, the second user interaction including a rotation of the removable device or an audible interaction with the removable device.

20. The method of claim 17, wherein the second interaction includes a rotation of the extendable sleeve, a rotation of the removable device, or an audible interaction with the removable device.

* * * * *

UNITED STATES PATENT AND TRADEMARK OFFICE
CERTIFICATE OF CORRECTION

PATENT NO. : 10,131,225 B2
APPLICATION NO. : 15/272714
DATED : November 20, 2018
INVENTOR(S) : David Tsai et al.

It is certified that error appears in the above-identified patent and that said Letters Patent is hereby corrected as shown below:

In the Claims

Claim 16, Column 10, Line 2: delete "removeable" and insert --removable--.

Signed and Sealed this
Twenty-fifth Day of December, 2018

Andrei Iancu
*Director of the United States Patent and Trademark Office*